UNITED STATES PATENT OFFICE.

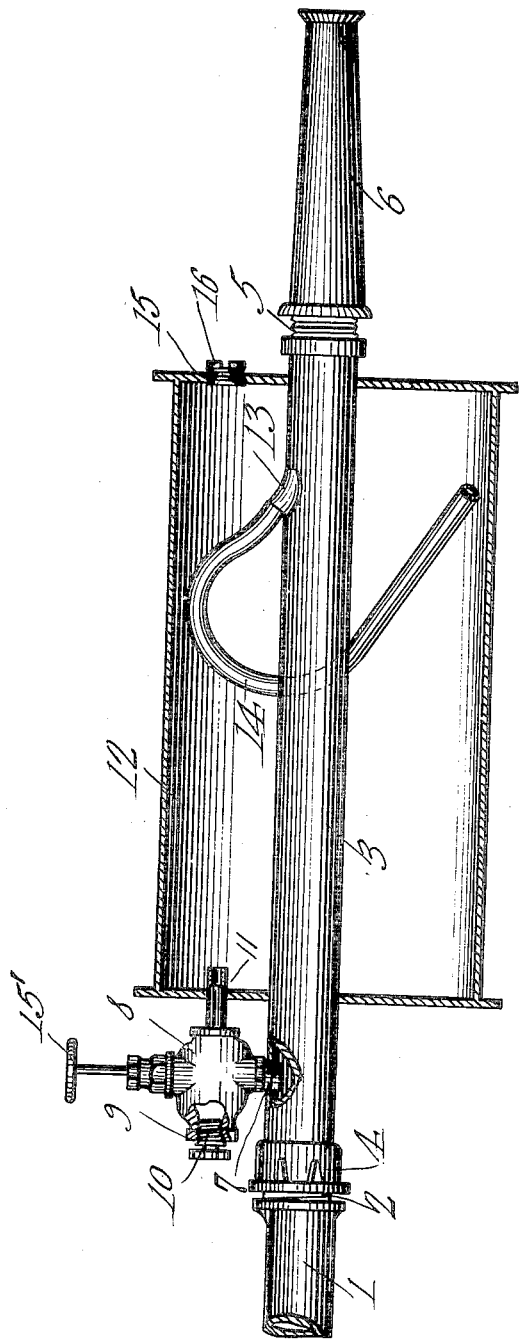

CHARLES F. SITES, OF NEWARK, OHIO.

CHEMICAL AND INSECTICIDE SPRAYER.

1,082,141.  Specification of Letters Patent.  Patented Dec. 23, 1913.

Application filed February 15, 1913. Serial No. 748,672.

*To all whom it may concern:*

Be it known that I, CHARLES F. SITES, a citizen of the United States, residing at Newark, in the county of Licking and State of Ohio, have invented a new and useful Chemical and Insecticide Sprayer, of which the following is a specification.

This invention relates to an apparatus for the spraying of chemicals or insecticides. The device may be used to handle any disinfectant solution and combined with any hydraulic force.

An object is to provide a spraying apparatus which may be positioned at any point in a water supply pipe line.

A further object is to provide a spraying apparatus which will be portable and which embodies a minimum number of valves, etc.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferable form of my invention is illustrated, in which the figure represents a plan view of my improved apparatus in which a portion of some of the walls have been broken away in order to more clearly illustrate the device.

Referring to the drawing by characters of reference 1 is the end portion of an ordinary garden hose or similar water supply pipe which is provided with the threaded end 2.

The numeral 3 designates a pipe provided with the threaded socket 4 at one end thereof and the externally threaded end 5 remote therefrom. To the end 5 is adapted to be attached a delivery nozzle 6.

Adjacent the end 4 of the pipe 3 is a nipple 7 which passes through a suitable aperture in the pipe 3 and communicates with the interior thereof. To the upper portion of the nipple 7 is secured a cut-off valve 8 which may be of the globe type or of other suitable construction, the particular feature of the present valve being an opening 9 at one end thereof into which is adapted to be placed a removable plug 10. The opening 9 is positioned upon the outlet side of the valve 8 and communicates directly with the outlet pipe 11 of the valve.

Secured to the pipe 3 and preferably located axially thereof is the chemical receiving chamber 12 which is preferably cylindrical in outline and is adapted to receive the chemical or insecticide therein and furthermore provides a suitable handle by which the entire apparatus may be manipulated.

The pipe 3 is provided with a lug 13 with an opening therein to which is secured a trap pipe 14, the object of which is to provide for a suitable outlet of the chemicals from within the chamber 12 to the pipe 3 in order that the chemicals may be delivered from the supply nozzle 6 of the apparatus. The end of the pipe 14 terminates approximately at the inner wall of the chamber 12. It is to be understood in this connection that the trap pipe 14 may wind or be curled one or more times about the pipe 3 or may partially encompass the same as illustrated in the drawings with the extreme end terminating adjacent the inner wall of the chamber 12. This construction however may be varied.

An opening 15 is provided at one end of the chamber 12 and a plug 16 is used for the suitable closing thereof, the opening 15 being used for the introduction of the insecticide or other substance within the chamber 12 when it is impossible or undesirable to introduce the same through the opening 9 of the valve 8.

In the practical use of my improved spraying apparatus, the plug 10 is first removed from the valve 8 and a suitable amount of chemicals in a liquid or semi-liquid or powdered form is introduced therein, the same being an insecticide or other solution which it is desired to mix with a large quantity of water and to spray over an extensive surface. After the chamber 12 has been suitably filled the water supplied through the pipe 1 is turned on and the said water or other liquid will be expelled through the nozzle 6 in a continuous stream in an ordinary manner. By the opening of the valve 8 by the valve wheel handle 15′, a certain portion of the water or other liquid flowing through the pipes 1 and 3 will be divided and forced upward through the pipe 7 through the valve 8 and through the valve outlet pipe 11 into the chemical containing chamber 12 with which the pipe 11 communicates. The water entering through the pipe 11 into the chemical containing chamber 12, mixes with and agitates the chemicals within the said chamber and the chemicals will be forced out through the trap pipe 14 through the lug opening 13 into the pipe 3 where they will mix with the liquid flowing through the pipe 3 and the mixture of chemicals and water will be delivered from the pipe 6 in a most efficient and thorough manner.

From the foregoing, it will be readily apparent that the amount of chemicals mixed with a given quantity of water will be dependent upon the amount of opening of the valve 8. Thus any desired mixture of water and chemicals can be obtained according to the chemicals used or the purpose for which the spraying apparatus is intended.

The device herein disclosed, it will be apparent, is simple, portable, and contains a minimum number of valves and other elements.

Having thus fully disclosed the construction and operation of my improved chemical and insecticide sprayer, it being understood that the same may be used for other and analogous purposes such as for instance a fire extinguisher, what I claim to be new and original is:—

1. A spraying apparatus comprising a pipe, a nozzle secured to one end thereof, a water supply secured to the other end thereof, a chemical receiving chamber secured to and surrounding said pipe intermediate of its ends, a valve communicating with said pipe and with said chemical receiving chamber, said valve provided with an auxiliary opening therein for the filling of said chamber, a trap pipe disposed within said chamber and communicating with said pipe.

2. In a spraying apparatus, the combination of a pipe, a cylindrical chamber concentric with said pipe and encompassing the same, a valve communicating with said pipe and with said chamber, and provided with an auxiliary opening for the filling of said chamber, means for the closing of said auxiliary valve opening, a trap pipe disposed within said chamber, one end of which terminates adjacent the inner wall of said chamber, the other end of which communicates with an opening in said pipe, and a delivery nozzle secured to said pipe.

3. In a spraying apparatus, the combination of a pipe, a cylindrical chamber concentric with said pipe and encompassing the same and forming a handle for the manipulation of the spraying apparatus, a valve communicating with the said pipe external of the said chamber and communicating with the said chamber, said valve provided with an auxiliary opening communicating with the outlet portion of said valve, means for the closure of said auxiliary valve opening, said pipe provided with an opening internal of the said chamber and adjacent the outlet end thereof, a trap pipe communicating with said pipe opening, disposed within the said chamber and with one end thereof terminating adjacent the inner wall of the said chamber, and means for connecting a supply pipe and delivery nozzle to the said first mentioned pipe.

In testimony that I claim the foregoing as my own, I have hereto affixed my signature in the presence of two witnesses.

CHARLES F. SITES.

Witnesses:
 EDWARD KIBLER, Sr.,
 EDWARD KIBLER, Jr.